United States Patent
He et al.

(10) Patent No.: US 10,350,963 B2
(45) Date of Patent: Jul. 16, 2019

(54) VEHICLE HEATING AND COOLING SYSTEM WITH PARALLEL HEAT EXCHANGERS AND CONTROL METHOD

(71) Applicant: FORD GLOBAL TECHNOLOGIES, LLC, Dearborn, MI (US)

(72) Inventors: Jing He, Novi, MI (US); Loren John Lohmeyer, III, Monroe, MI (US); Angelo Patti, Pleasant Ridge, MI (US); Manfred Koberstein, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 15/610,724

(22) Filed: Jun. 1, 2017

(65) Prior Publication Data
US 2018/0345756 A1 Dec. 6, 2018

(51) Int. Cl.
*B60H 1/00* (2006.01)

(52) U.S. Cl.
CPC ..... *B60H 1/00885* (2013.01); *B60H 1/00899* (2013.01); *B60H 2001/00928* (2013.01)

(58) Field of Classification Search
CPC ............ B60H 1/00885; B60H 1/00328; B60H 3/024; B60H 2001/00935; F25B 25/005
See application file for complete search history.

(56) References Cited

U.S. PATENT DOCUMENTS

| 3,675,441 A | 7/1972 | Perez |
| 5,921,092 A | 7/1999 | Behr et al. |
| 8,291,723 B1 | 10/2012 | Backman |
| 8,516,841 B2 | 8/2013 | Wittmann et al. |
| 8,794,026 B2 | 8/2014 | Kuehl et al. |
| 2012/0129066 A1 | 5/2012 | Ben-Aicha et al. |
| 2016/0031291 A1* | 2/2016 | Enomoto ........... B60H 1/00385 62/179 |

FOREIGN PATENT DOCUMENTS

CN 1587841 A 3/2005

OTHER PUBLICATIONS

English machine translation of CN1587841A.

* cited by examiner

*Primary Examiner* — Jonathan Bradford
(74) *Attorney, Agent, or Firm* — Vichit Chea; King & Schickli, PLLC

(57) ABSTRACT

A vehicle having a heating and cooling system includes a cold source through which a first flow of coolant flows, a heat source through which a second flow of coolant flows, and first and second parallel connected air-to-coolant heat exchangers. The first and second coolant flows are directed through one or both of the air-to-coolant heat exchangers dependent upon a mode of operation. A control module controls the first and second flows of coolant dependent upon the mode of operation.

18 Claims, 8 Drawing Sheets

PRIOR ART ized to reheat the passenger compartment where the thermal load is not significant. Even more, adjusting coolant flow rates through each of the heat exchangers allows temperature control without the need for blend doors.

VEHICLE HEATING AND COOLING SYSTEM WITH PARALLEL HEAT EXCHANGERS AND CONTROL METHOD

TECHNICAL FIELD

This document relates generally to vehicle heating and cooling systems, and more specifically to a heating and cooling system with parallel air-to-coolant heat exchangers.

BACKGROUND

Global warming legislations have been progressively phasing out the traditionally used refrigerant, R134a, a fluorinated greenhouse gas (F-gas) with a high Global Warming Potential (GWP) of 1,430. In fact, R134a has been banned in passenger and light commercial vehicles in the European Union (EU) (per Directive 2006/40/EC) since Jan. 1, 2017. New vehicles using R134a are no longer allowed to be registered, sold, or entered into service. The United States (US) Environmental Protection Agency also listed R134a as being unacceptable for newly manufactured light-duty vehicles beginning in Model Year (MY) 2021 with limited exceptions. Beginning in MY 2026, R134a will be unacceptable in all newly manufactured light-duty vehicles. Even more, the Australian government announced a legislative phase-down of hydrofluorocarbons (HFCs) imports in 2016 beginning Jan. 1, 2018, and targeted an 85% reduction of HFC emissions by 2036, joining the US and EU in early action to phase down HFCs.

The synthetic refrigerant, R1234yf, with a GWP of 4, has been the dominant replacement, due to its near drop-in feature. However, the price of R1234yf is significantly higher than R134a (even though it has been dropping year over year). Some Original Equipment Manufacturers (OEMs) have also raised concerns about the flammability of R1234yf. These concerns have prompted the automobile community to look for alternate refrigerants, for example, the natural refrigerant $CO_2$ (R744), or alternate designs to the conventional direction expansion (DX) system. The secondary loop system is one of the alternate designs.

A secondary loop system uses refrigerant to cool or heat a fluid (coolant) which is circulated in the cabin heat exchanger to provide cooling or heating. Compared to a direct expansion system where refrigerant flows through the cabin heat exchanger, a secondary loop system offers certain advantages. First, due to isolation of the refrigerant circuit, for example in the engine bay, the secondary loop system allows safe use of low-cost, low-GWP refrigerants like R744 ($CO_2$) and R152a. A R744 directed expansion system would require safety precautions to prevent leakage into the cabin while R152a is classified as flammable and normally considered unsafe for use in direct expansion systems. The compact design with fewer fittings and shorter hoses of a secondary loop system also reduces refrigerant charge and lifetime emission. As the coolant acts as thermal storage medium, the system is able to provide more comfort, and potentially better fuel economy, during stop/start and engine-off coasting. For dual HVAC and battery thermal management, a secondary loop design yields simplified plumbing and control.

The major challenges of a secondary loop system include reduced energy efficiency and added hardware such as a chiller, a coolant pump, and a reservoir. The former results from indirect heat transfer between refrigerant and air, and the latter introduces extra cost, mass, and packaging. In order to reduce the size and cost of such systems, the heat exchangers traditionally used for cooling and heating can be operated in parallel with each of the heat exchangers capable of heating or cooling dependent upon a mode of operation. The parallel connection of the heat exchangers allows smaller heat exchangers to be utilized as both may be working together dependent upon the mode of operation to achieve similar levels of cabin comfort. In a dehumidification and reheat mode of operation, the second heat exchanger may be util-

SUMMARY OF THE INVENTION

In accordance with the purposes and benefits described herein, a vehicle heating and cooling system is provided. The system may be broadly described as comprising a cold source through which a first flow of coolant flows, a heat source through which a second flow of coolant flows, first and second air-to-coolant heat exchangers connected in parallel and to the cold and heat sources to allow the first flow of coolant to be directed through at least one of the first and second air-to-coolant heat exchangers and the second flow of coolant to be directed through at least one of the first and second air-to-coolant heat exchangers dependent upon a mode of operation, and a control module for controlling the first and second flows of coolant dependent upon the mode of operation.

In another possible embodiment, at least two four-way valves connect the cold source, the heat source, and the first and second air-to-coolant heat exchangers. In another, the control module controls the at least two four-way valves.

In still another possible embodiment, the at least two four-way valves direct the first flow of coolant through the cold source and the first and second air-to-coolant heat exchangers for lowering a temperature within a passenger compartment in a cooling mode of operation.

In another possible embodiment, the at least two four-way valves direct the second flow of coolant through the heat source and the first and second air-to-coolant heat exchangers for raising a temperature within a passenger compartment in a heating mode of operation.

In still another possible embodiment, the at least two four-way valves direct the first flow of coolant through the cold source and the first air-to-coolant heat exchanger and the second flow of coolant through the heat source and the second air-to-coolant heat exchanger for controlling a temperature within the passenger compartment in a dehumidification and reheat mode of operation.

In yet another possible embodiment, the control module adjusts a rate of at least one of the first and second flows of coolant.

In one other possible embodiment, the vehicle heating and cooling system further includes a first pump for generating the first flow of coolant and a second pump for generating the second flow of coolant, and the control module controls at least one of the first and second pumps for controlling a temperature within the passenger compartment.

In yet still one other possible embodiment, at least two manifolds and two reservoirs connect the cold source, the heat source, and the first and second air-to-coolant heat exchangers. In another possible embodiment, the control module further controls the at least two manifolds and two reservoirs.

In another possible embodiment, each of the at least two manifolds and two reservoirs include at least one sending port and at least one receiving port and the control module controls a degree of openness of the at least one sending port and the at least one receiving port of the at least two manifolds and two reservoirs.

In still another possible embodiment, the first flow of coolant is pumped through the cold source for cooling the first flow of coolant, directed by the second manifold through the first and second air-to-coolant heat exchangers for lowering a temperature within the passenger compartment in a cooling mode of operation, and returned to the second reservoir.

In yet another possible embodiment, the second flow of coolant is pumped through the heat source for warming the second flow of coolant, directed by the first manifold through the first and second air-to-coolant heat exchangers for raising a temperature within the passenger compartment in a heating mode of operation, and returned to the first reservoir.

In yet one other possible embodiment, the first flow of coolant is pumped through the cold source for cooling the first flow of coolant, directed by the second manifold through the first air-to-coolant heat exchanger, and returned to the second reservoir, and the second flow of coolant is pumped through the heat source for warming the second flow of coolant, directed by the first manifold through the second air-to-coolant heat exchanger, and returned to the first reservoir, for controlling a temperature within the passenger compartment in a dehumidification and reheat mode of operation.

In another possible embodiment, one of the first flow of coolant and the second flow of coolant is directed through an auxiliary coolant loop for changing a temperature of a component.

In one other possible embodiment, a vehicle heating and cooling system includes a refrigerant loop having at least first and second refrigerant-to-coolant heat exchangers, a compressor, and an expansion device through which a refrigerant flows, a coolant loop connected to allow a first flow of coolant, cooled within the first refrigerant-to-coolant heat exchanger, to be directed through at least one of first and second air-to-coolant heat exchangers connected in parallel, and to allow a second flow of coolant, heated within the second refrigerant-to-coolant heat exchanger, to be directed through the at least one of first and second air-to-coolant heat exchangers connected in parallel dependent upon a mode of operation, and a control module for controlling the first and second flows of coolant dependent upon the mode of operation.

In accordance with the purposes and benefits described herein, a method is provided of heating and cooling a passenger compartment in a vehicle. The method may be broadly described as comprising the steps of: (a) pumping a first flow of coolant through a cold source; (b) pumping a second flow of coolant through a heat source; (c) routing the first coolant flow through at least one of first and second air-to-coolant heat exchangers connected in parallel; (d) routing a second coolant flow through at least one other of the first and second air-to-coolant heat exchangers connected in parallel; and (e) controlling the pumping and routing steps dependent upon a mode of operation.

In another possible embodiment, the first flow of coolant is pumped through the cold source and routed through each of the first and second air-to-coolant heat exchangers in a cooling mode of operation.

In still another possible embodiment, the second flow of coolant is pumped through the heat source and routed through each of the first and second air-to-coolant heat exchangers in a heating mode of operation.

In one other possible embodiment, the first flow of coolant is pumped and routed through the first air-to-coolant heat exchanger and the second flow of coolant is pumped and routed through the second air-to-coolant heat exchanger in a dehumidification and reheating mode of operation.

In the following description, there are shown and described several embodiments of a vehicle heating and cooling system and related methods of heating and cooling a passenger compartment in the vehicle. As it should be realized, the methods and systems are capable of other, different embodiments and their several details are capable of modification in various, obvious aspects all without departing from the methods and assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle heating and cooling system and related methods and together with the description serve to explain certain principles thereof. In the drawing figures.

Figure 6:
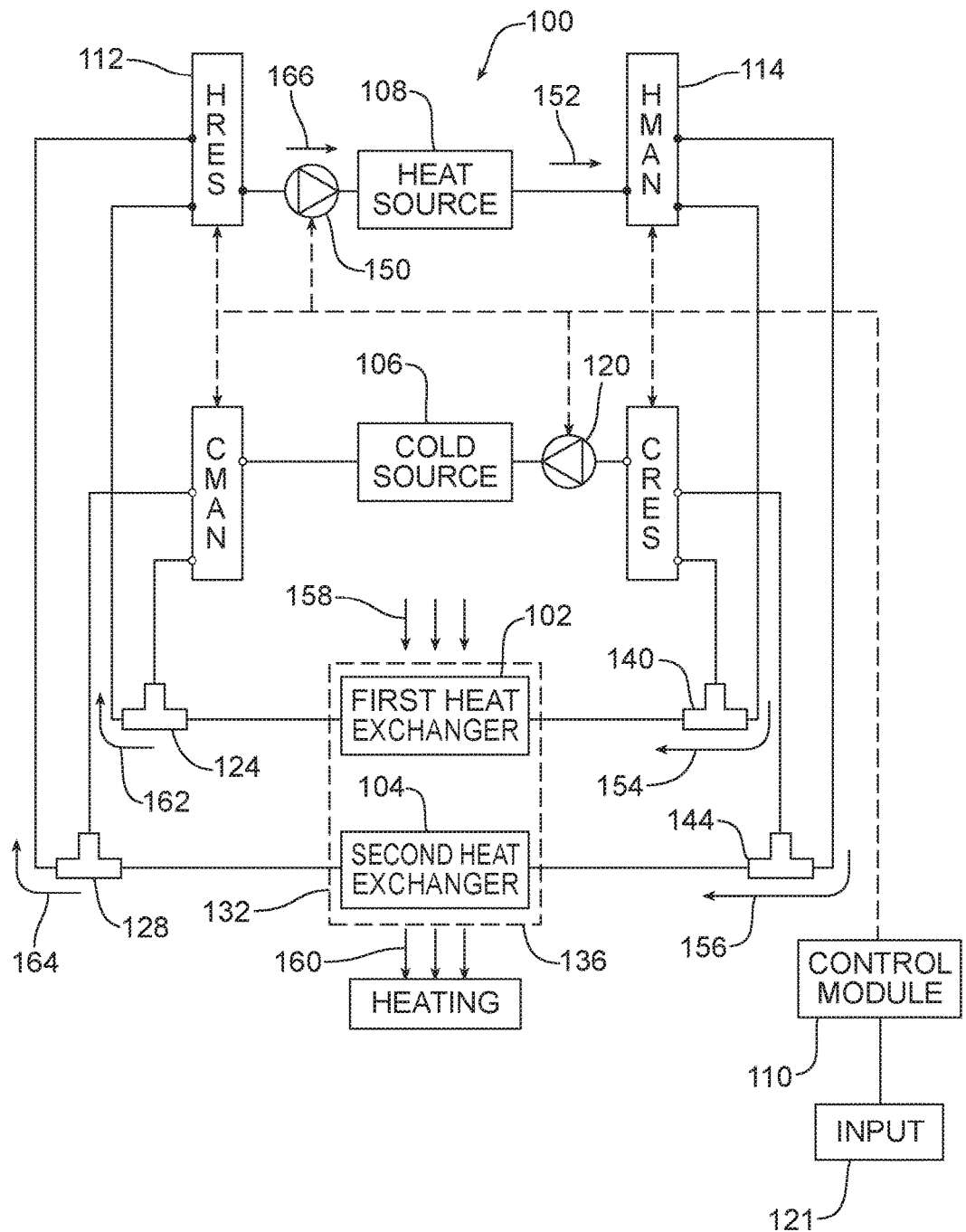
Figure 7:
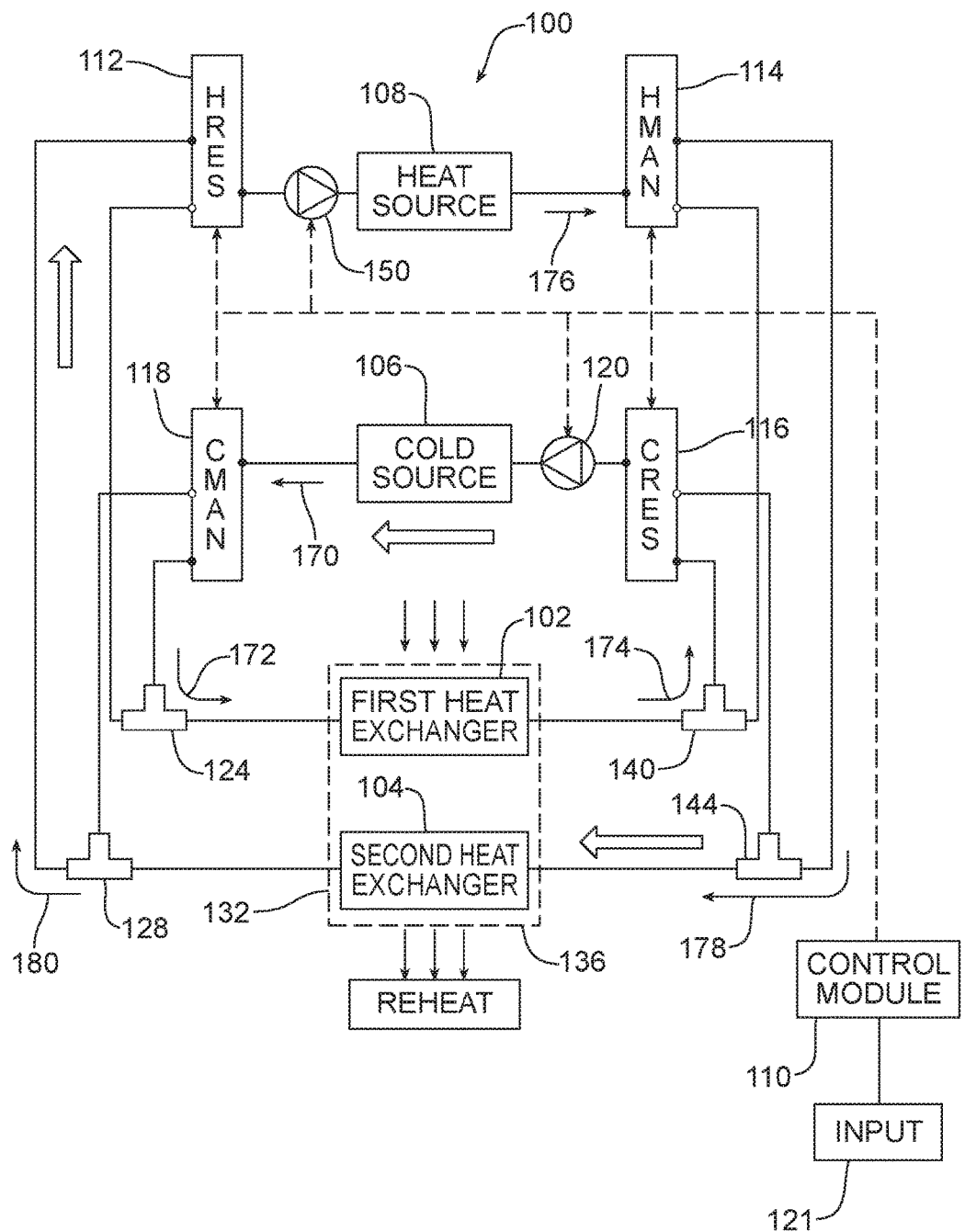

FIG. 6 is a schematic diagram of a vehicle heating and cooling system operating in a heating mode of operation having first and second air-to-coolant heat exchangers connected in parallel and to first and second manifolds and reservoirs; and FIG. 7 is a schematic diagram of a vehicle heating and cooling system operating in a dehumidification and reheat mode of operation having first and second air-to-coolant heat exchangers connected in parallel and to first and second manifolds and reservoirs.

Reference will now be made in detail to the present embodiments of the vehicle heating and cooling system and related methods of heating and cooling a passenger compartment, examples of which are illustrated in the accompanying drawing figures, wherein like numerals are used to represent like elements.

DETAILED DESCRIPTION

Figure 1:
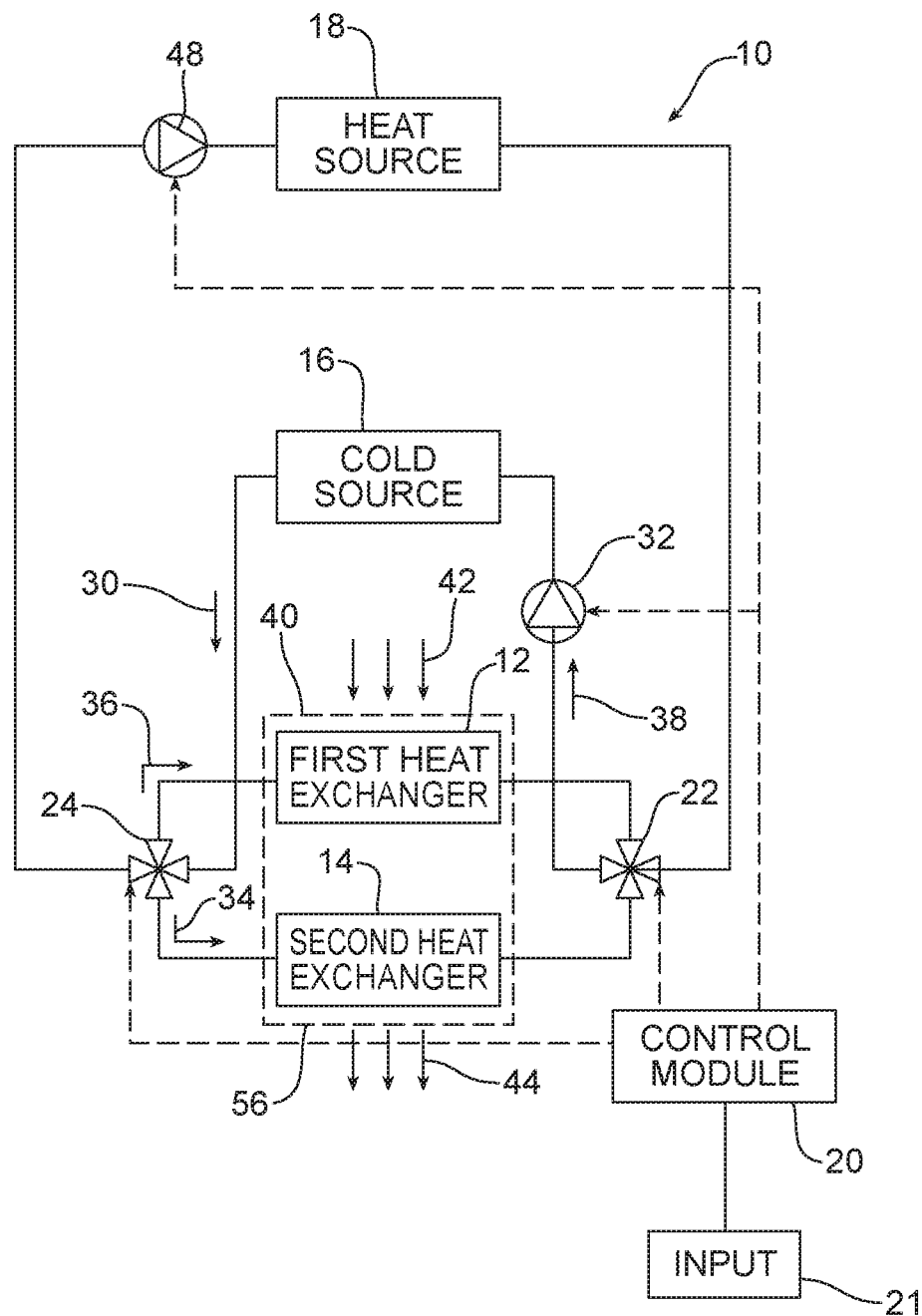
FIG. 1 is a schematic diagram of a vehicle heating and cooling system operating in a cooling mode of operation having first and second air-to-coolant heat exchangers connected in parallel and to first and second four-way valves.

Reference is now made to FIG. 1 which illustrates a schematic diagram of a vehicle heating and cooling system 10 including first and second air-to-coolant heat exchangers 12, 14. The first and second air-to-coolant heat exchangers 12, 14 are connected in parallel in each embodiment. The first and second air-to-coolant heat exchangers 12, 14 are further connected to a cold source 16 through which a first flow of coolant may flow and a heat source 18 through which a second flow of coolant may flow. The system 10 is connected to allow the first flow of coolant to be directed through at least one of the first and second air-to-coolant heat exchangers 12, 14 and the second flow of coolant to be directed through at least one of the first and second air-to-coolant heat exchangers dependent upon a mode of operation of the system 10. A control module 20 controls the first and second flows of coolant dependent upon the mode of operation as is described below.

In the embodiment described in FIG. 1, the control module 20 is electrically connected to components within the system 10 (as shown by dashed lines) in addition to first and second four-way valves 22, 24. The first and second four-way valves 22, 24 connect the cold source 16 and the heat source 18 to the first and second air-to-coolant heat exchangers 12, 14 and direct or control the flows of coolant through the system 10 in response to the control module 20 and the mode of operation. Each of the four-way valves may be replaced in alternate embodiments by a series of one-way, two-way, and/or three-way valves sufficient to direct the coolant flows in desired directions dependent upon the mode of operation. Again, the valves in the series of valves receive signals from and are controlled by the control module.

While the described embodiment utilizes a single control module 20 to control the components within the system 10, any of a plurality of control modules connected to a vehicle computer via a controller area network (CAN) bus or a local interconnect network (LIN) in the vehicle, as is known in the art, could be utilized to control one or more of the plurality of components of the system 10. In the described embodiment, the control module 20 is responsive to an input 21 operated by an occupant in the vehicle. The input 21 (e.g., an AC on/off switch) changes a mode of operation from, for example, a cooling mode to an off mode, a heating mode, or other mode of operation.

Figure 2A:
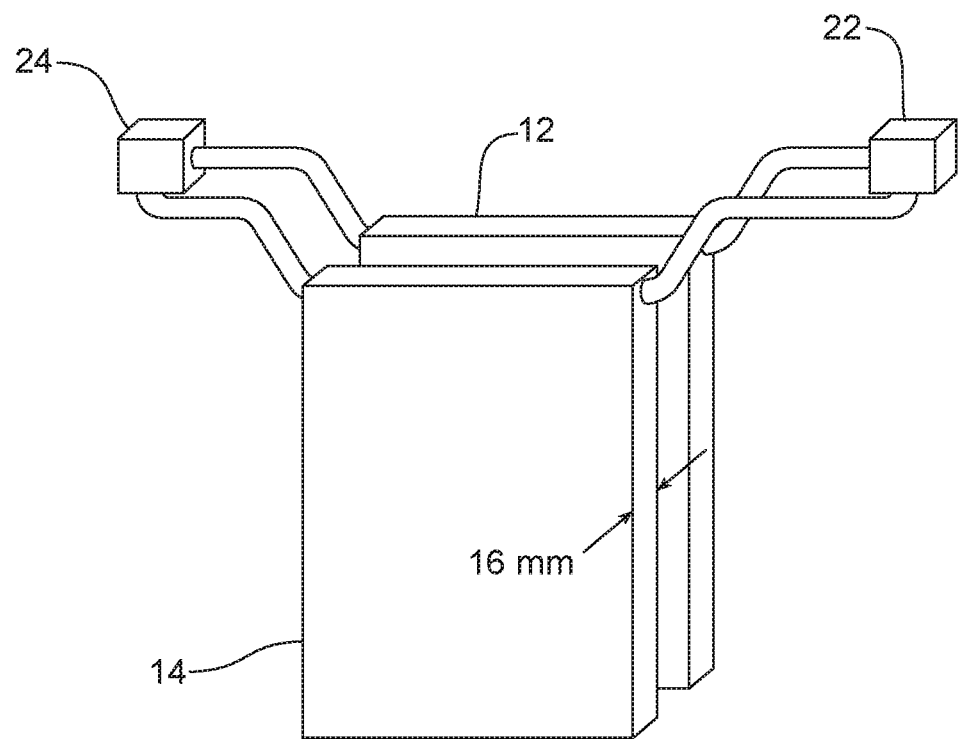
FIG. 2A is an illustration of first and second air-to-coolant heat exchangers connected in parallel.

As illustrated in FIG. 2A, the first and second air-to-coolant heat exchangers 12, 14 are connected in parallel to the first and second four-way valves 22, 24. This allows both the first and second air-to-coolant heat exchangers 12, 14 to operate together in a cooling mode of operation or in a heating mode of operation. In other words, the first flow of coolant through the cold source 16 or the second flow of coolant through the heat source 18 is directed through both of the first and second air-to-coolant heat exchangers 12, 14 in the cooling or heating modes of operation. In this manner, both heat exchangers 12, 14 are utilized. Connecting the first and second air-to-coolant heat exchangers 12, 14 in this manner allows the air-to-coolant heat exchangers to be reduced in size while still achieving the same amount of work as prior art heat exchangers which were not connected in parallel and operated individually in cooling or heating modes of operation.

Figure 2B:
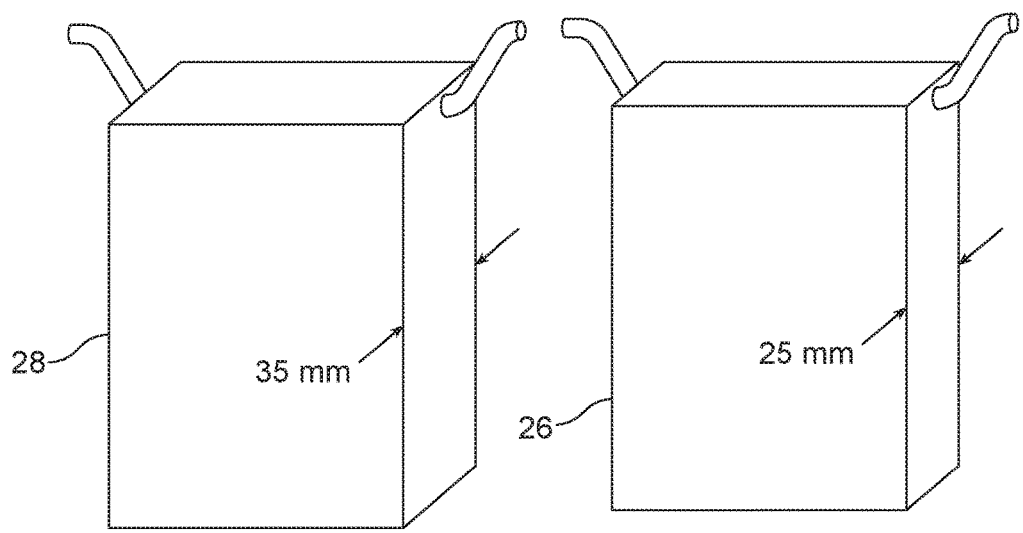
FIG. 2B is an illustration of prior art air-to-coolant heat exchangers emphasizing their large size and thickness.

As shown in FIG. 2B, in such prior art systems, one air-to-coolant or air-to-refrigerant heat exchanger 28 is utilized in a cooling mode of operation and a second air-to-coolant or air-to-refrigerant heat exchanger 26 is utilized in a heating mode of operation. Since the prior art heat exchangers work independently, they must maintain a sufficient capacity to suitably heat or cool the passenger compartment. This results in the use of two larger, or full sized heat exchangers. For example, a typical prior art air-to-coolant heat exchanger/heater core 26 may have a thickness of twenty-five mm and a typical prior art air-to-coolant heat exchanger/evaporator 28 may have a thickness of thirty-five mm. In the parallel configuration shown in FIG. 2A, however, a thickness of the air-to-coolant heat exchangers 14, 16 can be significantly reduced (e.g., reduced to sixteen mm) thereby reducing the size and cost of the heat exchangers/overall systems while still sufficiently controlling the passenger compartment climate.

Returning to FIG. 1, the system 10 is illustrated in a cooling mode of operation for lowering a temperature within a passenger compartment. As shown, the first four-way valve 24 directs the first flow of coolant pumped through the cold source 16 by pump 32 (as shown by action arrow 30) to both the first and second air-to-coolant heat exchangers 12, 14 (as shown by action arrows 34 and 36). As indicated above, control module 20 is electrically connected to the intervening four-way valve 24 and signals the four-way valve to direct the cooled coolant to the first and second air-to-coolant heat exchangers 12, 14. In addition, the control module 20 controls pump 48 used to create the second flow of coolant through the heat source 18. In the described cooling mode of operation, the pump 48 is turned off, a rate of flow of the second flow of coolant is zero, and the intervening four-way valve 24 is closed such that coolant cannot flow from the first and second air-to-coolant heat exchangers 12, 14 to the heat source 18.

In the described cooling mode of operation, the first and second air-to-coolant heat exchangers 12, 14 function as coolers. As is known in the art, the first and second air-to-coolant heat exchangers 12, 14 are positioned within a heating, ventilation, and air conditioning (HVAC) case 40 of the vehicle. Warm, moist air flowing across the first and second air-to-coolant heat exchangers 12, 14 (as shown by action arrows 42) transfers its heat to the cold coolant drawn through the first and second air-to-coolant heat exchangers by pump 32. The byproducts are a lowered temperature air entering the passenger compartment and possible condensation from the air which is routed from the first and second air-to-coolant heat exchangers 12, 14 to an exterior of the vehicle. A blower (not shown) blows the air across the first and second air-to-coolant heat exchangers 12, 14 and through a vent 56 into the passenger compartment (as shown by arrows 44). This process results in the passenger compartment having a cooler, drier air therein.

As indicated above, control module 20 is electrically connected to the intervening four-way valve 22 and signals the four-way valve to direct the warmed coolant to the cold source 16 (shown by action arrow 38). In the cold source 16, the warmed coolant is again cooled by giving off heat, and cycled through the system 10. Again, in the cooling mode of operation, the pump 48 is turned off, a rate of flow of the second flow of coolant is zero, and the intervening four-way valve 22 is closed such that coolant cannot flow from the first and second air-to-coolant heat exchangers 12, 14 to the heat source 18.

In accordance with the invention, the cold source 16 may be any type of source sufficient to cool the first flow of coolant. For example, the cold source 16 may a chiller, an evaporator, and/or a thermal storage. Similarly, the heat source 18 may be any type of source sufficient to heat the second flow of coolant. For example, the heat source 18 may be a condenser, an engine, electronics, a positive temperature coefficient heater, and/or thermal storage.

Figure 3:
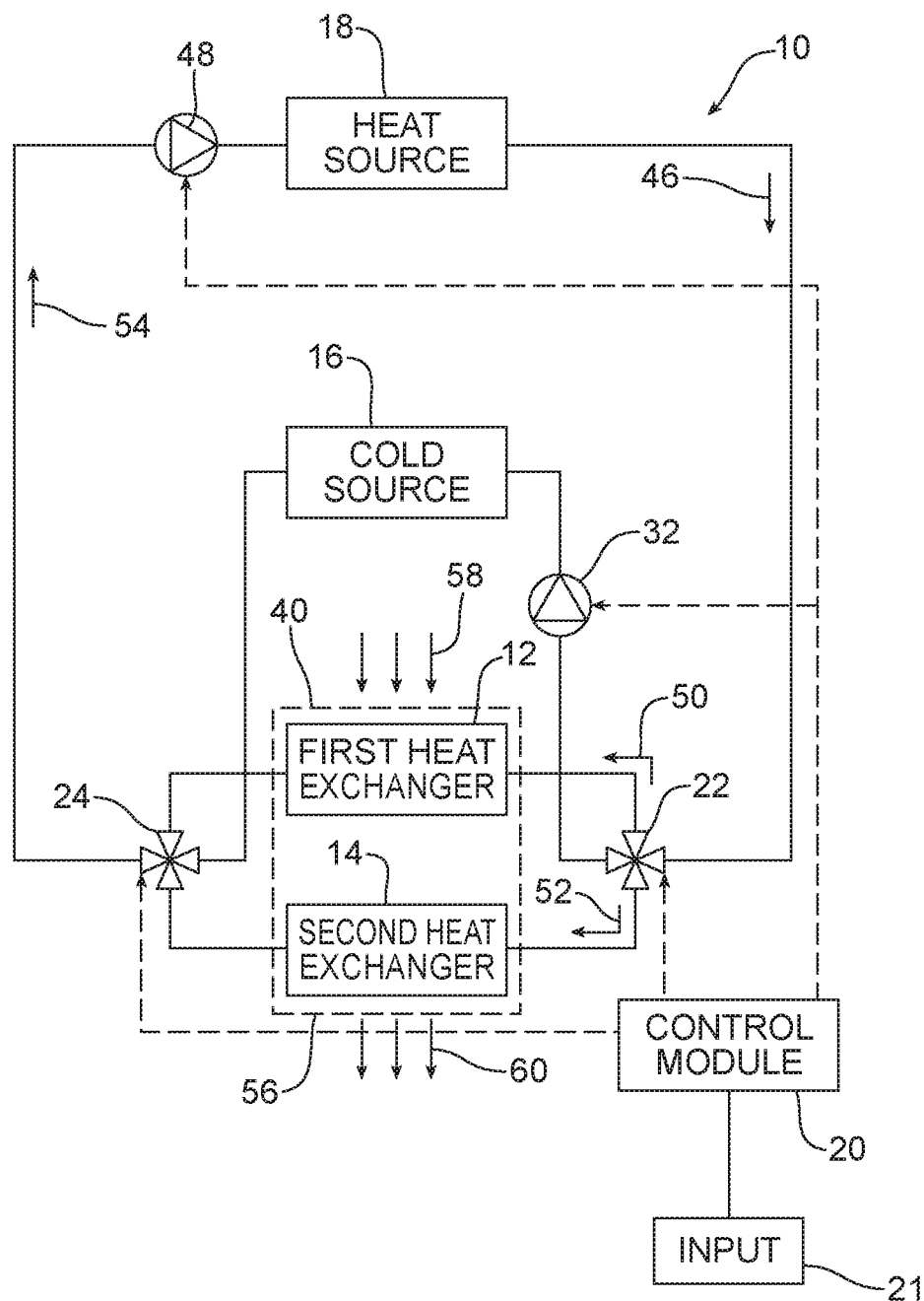
FIG. 3 is a schematic diagram of a vehicle heating and cooling system operating in a heating mode of operation having first and second air-to-coolant heat exchangers connected in parallel and to first and second four-way valves.

In a heating mode of operation, the system 10 is configured as shown in FIG. 3. As shown, the second four-way valve 22 directs the second flow of coolant (as shown by action arrow 46) drawn through the heat source 18 by pump 48 through both the first and second air-to-coolant heat exchangers 12, 14 (as shown by action arrows 50 and 52). As indicated above, control module 20 is electrically connected to the intervening four-way valve 22 and signals the four-way valve to direct the warmed coolant to the first and second air-to-coolant heat exchangers 12, 14. In this mode of operation, the pump 32 is turned off, a rate of flow of the first flow of coolant is zero, and the intervening four-way valve 22 is closed such that coolant cannot flow from the first and second air-to-coolant heat exchangers 12, 14 to the cold source 16.

As described above with regard to the cooling mode, the air-to-coolant heat exchangers 12, 14 are positioned within the HVAC case 40 but, in the heating mode, the air-to-coolant heat exchangers 12, 14 are each used to warm the passenger compartment. Cold air flowing across the air-to-coolant heat exchangers 12, 14 (as shown by arrows 58) absorbs heat from the warm coolant thereby increasing the temperature of the air. A blower (not shown) blows the air across the air-to-coolant heat exchangers 12, 14 and through the vent 56 into the passenger compartment as shown by arrows 60. This process results in the passenger compartment having a warmer air therein. As indicated above, control module 20 is electrically connected to the intervening four-way valve 24 and signals the four-way valve to direct the combined, cooled coolant to the heat source 16 (as shown by action arrow 54). In the heat source 18, the cooled coolant is again warmed by absorbing heat, and cycled through the system 10.

Figure 4:
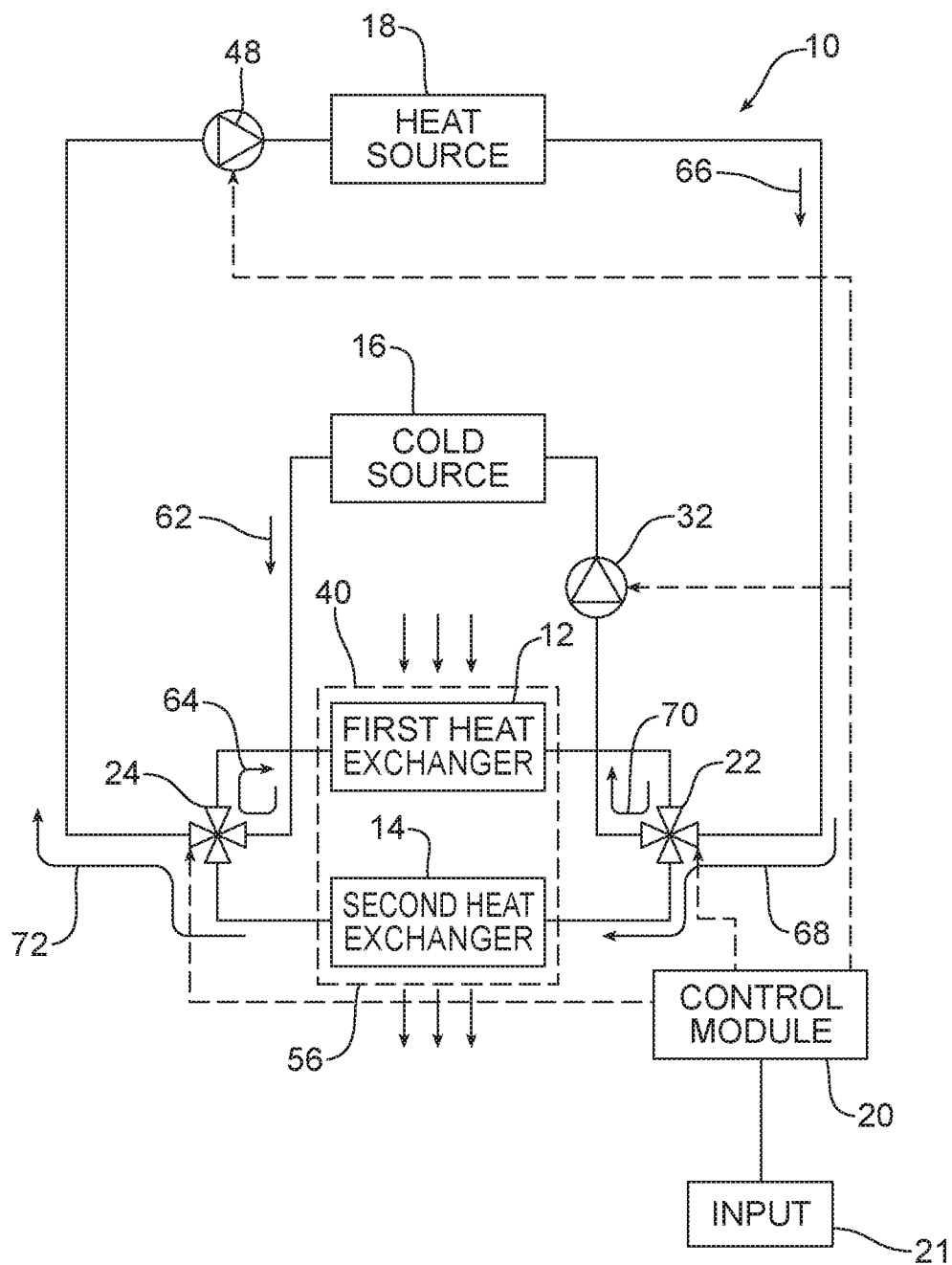
FIG. 4 is a schematic diagram of a vehicle heating and cooling system operating in a dehumidification and reheat mode of operation having first and second air-to-coolant heat exchangers connected in parallel and to first and second four-way valves.

In a dehumidification and reheat mode of operation, shown in FIG. 4, cold coolant is drawn from the cold source 16 by pump 32 and directed to the first air-to-coolant heat exchanger 12 via first four-way valve 24 (as shown by action arrows 62 and 64) and warm coolant is concurrently drawn from the heat source 18 by pump 48 and directed to the second air-to-coolant heat exchanger 14 via second four-way valve 22 (as shown by action arrows 66 and 68).

In this mode of operation, the first air-to-coolant heat exchanger 12 functions as a cooler in the manner described above for the cooling mode of operation and is used to cool and dehumidify the moist, warm air. Within the first air-to-coolant heat exchanger 12, the cold coolant is warmed due to the heat removed from the air and is drawn through first four-way valve 22 (as shown by action arrow 70) by pump 32 which valve directs the warmed coolant back to the cold source 16. As indicated above, control module 20 is electrically connected to the pump 32 and intervening four-way valve 22 and signals the four-way valve to direct the warmed coolant to the cold source 16. In the cold source 16, the warmed coolant is again cooled, and cycled through the system 10.

Concurrently, the second air-to-coolant heat exchanger 14 functions as a heater core in the manner described above for the heating mode of operation and is used to heat the cooled, dehumidified air entering the passenger compartment. Within the second air-to-coolant heat exchanger 14, the warm coolant is cooled due to the heat removed to the air and is drawn through the second four-way valve 24 (as shown by action arrow 72) by pump 48 which valve directs the cooled coolant back to the heat source 18. Again, control module 20 is electrically connected to the pump 48 and intervening four-way valve 24 and signals the four-way valve to direct the cooled coolant to the heat source 18. In the heat source 18, the cooled coolant is again warmed, and cycled through the system 10.

In the dehumidification and reheat mode of operation, the first and second air-to-coolant heat exchangers 12, 14 may be utilized to provide a temperature blending function traditionally provided by a blend door. In prior art systems, a mechanical blend door or flap was utilized to adjust the ratio of the cooled, dehumidified air entering the heating heat exchanger (e.g. heater core or condenser) to control a temperature of the air entering the passenger compartment. In the described embodiment, however, the temperature of the air entering the passenger compartment may be controlled through control of the first and second air-to-coolant heat exchangers 12, 14 and/or the first and second flows of coolant, thereby eliminating the need for a blend door.

In one embodiment, the air temperature is controlled by adjusting a rate of coolant flow through one or both of the air-to-coolant heat exchangers 12, 14. In other words, a flow rate of the first flow through the heat source 18, the second flow through the cold source 16, or both the first and the second flows are controlled. Such control can be achieved utilizing control module 20 to adjust one or both of the pumps 32, 48 and/or the four-way valves 22, 24.

Figure 5:
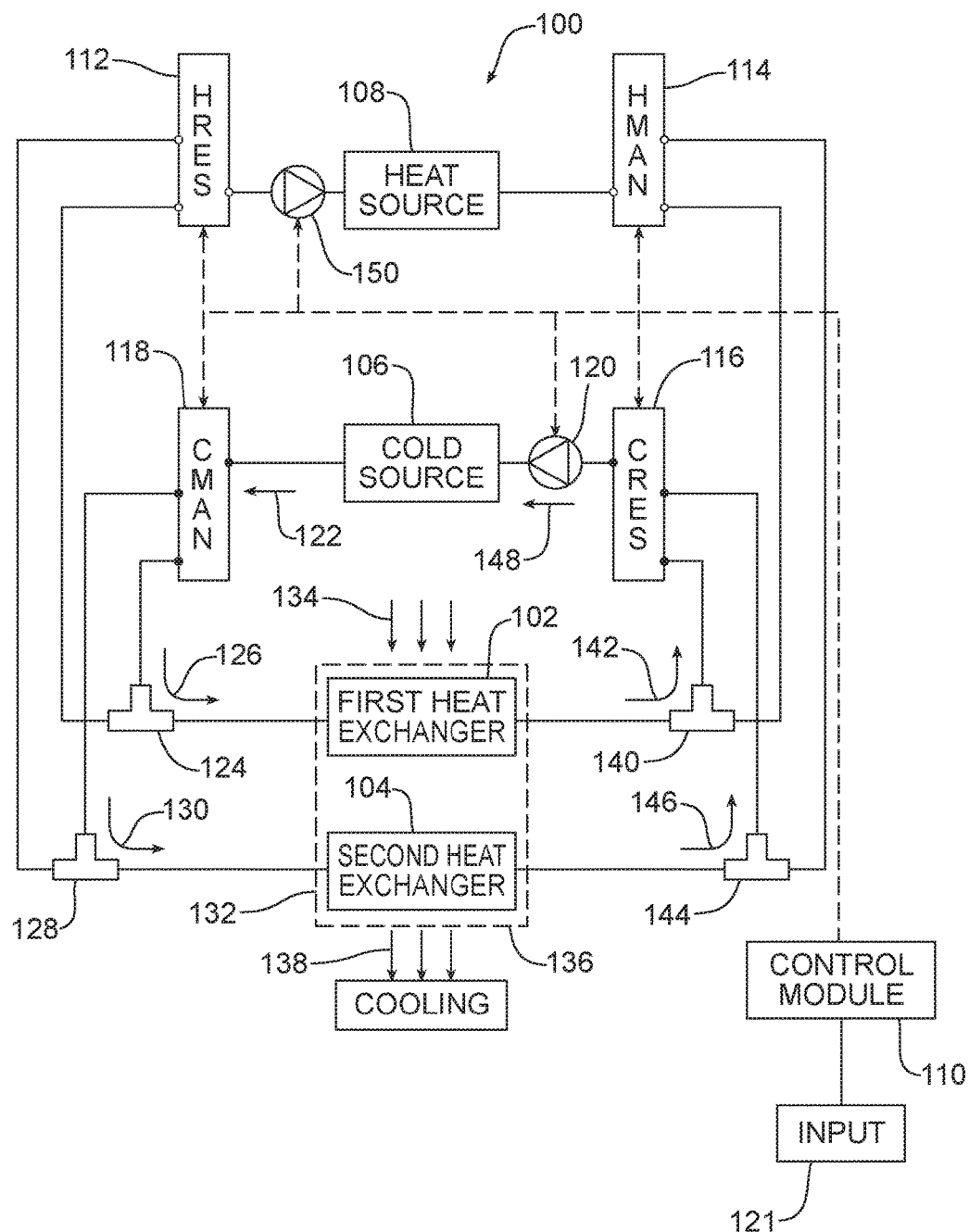
FIG. 5 is a schematic diagram of a vehicle heating and cooling system operating in a cooling mode of operation having first and second air-to-coolant heat exchangers connected in parallel and to first and second manifolds and reservoirs.

FIG. 5 illustrates a schematic diagram of an alternate embodiment of a vehicle heating and cooling system 100 including first and second air-to-coolant heat exchangers 102, 104. The first and second air-to-coolant heat exchangers 102, 104 are connected in parallel and further connected to a cold source 106 through which a first flow of coolant may flow and a heat source 108 through which a second flow of coolant may flow. The system 100 is connected to allow the first flow of coolant to be directed through at least one of the first and second air-to-coolant heat exchangers 102, 104 and the second flow of coolant to be directed through at least one of the first and second air-to-coolant heat exchangers dependent upon a mode of operation of the system 100. A control module 110 controls the first and second flows of coolant dependent upon the mode of operation as is described below.

In the embodiment described in FIG. 5, the control module 110 is electrically connected to components within the system 100 (as shown by dashed lines) in addition to a first reservoir 112 and a first manifold 114 used to direct the first flow of coolant through at least one of the air-to-coolant heat exchangers 102, 104, and a second reservoir 116 and a second manifold 118 used to direct the second flow of coolant through at least one of the air-to-coolant heat exchangers in response to the control module 110 and the mode of operation. As noted above, the control module 110 may be replaced by any of a plurality of control modules connected to a vehicle computer via a CAN bus or a LIN in the vehicle. As shown, the control module 110 is responsive to an input 121 operated by an occupant of the vehicle.

In this embodiment, the control module 110 controls an openness of sending and receiving ports in the first reservoir 112 and the first manifold 114 to control the first flow of coolant and an openness of sending and receiving ports in the second reservoir 116 and the second manifold 118 to control the second flow of coolant dependent upon the mode of operation and desired output. The utilization of reservoirs and manifolds with modulating functionality eliminates use of certain valves and junctions which results in both cost savings and minimized coolant leakage. The various paths of the coolant flows are described for the various modes of operation below.

In a cooling mode of operation, as shown in FIG. 5, a first pump 120 draws cooled coolant (as shown by action arrow 122) from the cold source 106 into the second manifold 118 through the receiving port. The second manifold 118 serves as a cold coolant manifold or chamber having at least one receiving port and two sending ports with modulating functionality. As indicated above, control module 110 is electrically connected to the second manifold 118 opening the receiving and sending ports (shown by filled circles). In the described cooling mode of operation, the control module 110 opens two sending ports of the second manifold 118 directing the cooled coolant through intervening T-junction 124 to the first air-to-coolant heat exchanger 102 (as shown by action arrow 126) and through intervening T-junction 128 to the second air-to-coolant heat exchanger 104 (as shown by action arrow 130). In addition, the control module 110 controls pump 150 used to create the second flow of coolant through the heat source 108. In the described cooling mode of operation, the pump 150 is turned off, a rate of flow of the second flow of coolant is zero, and the various receiving and sending ports of the first reservoir 112 and the first manifold 114 are closed such that coolant cannot flow from the first and second air-to-coolant heat exchangers 102, 104 to the heat source 108.

In the described cooling mode of operation, the first and second air-to-coolant heat exchangers 102, 104 function as coolers. As is known in the art, the first and second air-to-coolant heat exchangers 102, 104 are positioned within a heating, ventilation, and air conditioning (HVAC) case 132 of the vehicle. Warm, moist air flowing across the first and second air-to-coolant heat exchangers 102, 104 (as shown by arrows 134) transfers its heat to the cold coolant drawn through the first and second air-to-coolant heat exchangers by pump 120. The byproducts are a lowered temperature air entering the passenger compartment and possible condensation from the air which is routed from the first and second air-to-coolant heat exchangers 102, 104 to an exterior of the vehicle. A blower (not shown) blows the air across the first and second air-to-coolant heat exchangers 102, 104 and through a vent 136 into the passenger compartment (as shown by arrows 138). This process results in the passenger compartment having a cooler, drier air therein.

The warmed coolant is drawn by pump 120 to a second reservoir 116. The second reservoir 116 is an accumulator which serves as a cold coolant reservoir having receiving and sending ports with modulating functionality. Control module 110 is further electrically connected to the second reservoir 116 and operates to open a first receiving port to receive the warmed coolant from the first air-to-coolant heat exchanger 102 via a T-junction 140 (as shown by action arrow 142), a second receiving port to receive the warmed coolant from the second air-to-coolant heat exchanger 104 via a T-junction 144 (as shown by action arrow 146), and to direct the coolant back to the cold source 106 (as shown by action arrow 148) via the sending port of the second reservoir 116. In the cold source 106, the warmed coolant is again cooled, and cycled through the system 100.

In a heating mode of operation, the system 110 is configured as shown in FIG. 6. As shown, a second pump 150 draws heated coolant (as shown by action arrow 152) from the heat source 108 to the first manifold 114. The first manifold 114 serves as a hot coolant manifold or chamber having at least one receiving port and two sending ports with modulating functionality. As indicated above, control module 110 is electrically connected to the first manifold 114 opening the receiving and sending ports (shown by filled circles). In the described heating mode, the control module 110 opens two sending ports of the first manifold 114 directing the heated coolant through intervening T-junction 140 to the first air-to-coolant heat exchanger 102 (as shown by action arrow 154) and through intervening T-junction 144 to the second air-to-coolant heat exchanger 104 (as shown by action arrow 156). In addition, the control module 110 controls pump 120 used to create the first flow of coolant through the cold source 106. In the described heating mode of operation, the pump 120 is turned off, a rate of flow of the first flow of coolant is zero, and the various receiving and sending ports of the second reservoir 116 and the second manifold 118 are closed such that coolant cannot flow from the first and second air-to-coolant heat exchangers 102, 104 to the cold source 106.

As described above with regard to the cooling mode, the air-to-coolant heat exchangers 102, 104 are positioned within the HVAC case 132 of the vehicle and are used to warm the passenger compartment. Cold air flowing across the air-to-coolant heat exchangers 102, 104 (as shown by arrows 158) absorbs heat from the heated coolant thereby increasing the temperature of the air. A blower (not shown) blows air across the air-to-coolant heat exchangers 102, 104 and through the vent 136 into the passenger compartment (as shown by action arrows 160). This process results in the passenger compartment having a warmer air therein.

Within the first and second air-to-coolant heat exchangers 102, 104, the heated coolant is cooled due to the heat given to the air and directed to the first reservoir 112. Again, control module 110 is electrically connected to the second pump 150 and the first reservoir 112 to open a first receiving port to receive the cooled coolant from the first air-to-coolant heat exchanger 102 via the T-junction 124 (as shown by action arrow 162), a second receiving port to receive the cooled coolant from the second air-to-coolant heat exchanger 104 via the T-junction 128 (as shown by action arrow 164), and to direct the coolant back to the heat source 108 (as shown by action arrow 166) via the sending port. In the heat source 108, the cooled coolant is again heated, and cycled through the system 100.

In a dehumidification and reheat mode of operation, shown in FIG. 7, the first pump 120 draws cooled coolant from the cold source 106 to the second manifold 118 (as shown by action arrow 170) which serves as a cold coolant manifold. As indicated above, control module 110 is electrically connected to the second manifold 118 opening the receiving port and one sending port directing the cold coolant through intervening T-junction 124 to the first air-to-coolant heat exchanger 102 (as shown by action arrow 172).

Again, the first air-to-coolant heat exchanger 102 functions as a cooler in the manner described above and is used to cool and dehumidify the moist, warm air. Within the first air-to-coolant heat exchanger 102, the cold coolant is warmed due to the heat removed from the air and is drawn to the second reservoir 116 via the intervening T-junction 140 (as shown by action arrow 174) which directs the warmed coolant via the pump 120 back to the cold source 106. As indicated above, control module 110 is electrically connected to the pump 120 and second reservoir 116 and signals the second reservoir to direct the warmed coolant to the cold source 106. In the cold source 106, the warmed coolant is again cooled, and cycled through the system 100.

Concurrently, the second pump 150 draws hot coolant (as shown by action arrow 176) from the heat source 108 to the first manifold 114 which serves as a hot coolant manifold. As indicated above, control module 110 is electrically connected to the first manifold 114 opening the receiving port and one sending port directing the hot coolant through intervening T-junction 144 to the second air-to-coolant heat exchanger 104 (as shown by action arrow 178).

As described above, the second air-to-coolant heat exchanger 104 functions as a heater core to heat the cooled, dehumidified air and warm the air entering the passenger compartment. Within the second air-to-coolant heat exchanger 104, the hot coolant is cooled due to the heat removed to the air and is drawn to the first reservoir 112 via the intervening T-junction 128 (as shown by action arrow 180) which directs the cooled coolant via the pump 150 back to the heat source 108. As indicated above, control module 110 is electrically connected to the pump 150 and first reservoir 112 and signals the first reservoir to direct the cooled coolant to the heat source 108. In the heat source 108, the cooled coolant is again heated, and cycled through the system 100.

As described above with regard the 4-way valve embodiment, the first and second air-to-coolant heat exchangers 102, 104 may be utilized in the dehumidification and reheat mode of operation to provide a temperature blending function traditionally provided by a blend door. In the embodiment shown in FIG. 7, the temperature of the air entering the passenger compartment may be controlled through control of the first and second air-to-coolant heat exchangers 102, 104 and/or the first and second flows of coolant.

In one embodiment, the air temperature is controlled by adjusting a rate of coolant flow through one or both of the air-to-coolant heat exchangers 102, 104. In other words, a flow rate of the first flow through the heat source 108, the second flow through the cold source 106, or both the first and the second flows are controlled. Such control can be achieved utilizing control module 110 to adjust one or both of the pumps 120, 150 and/or the first and second manifolds 114, 118 and reservoirs 112, 116.

A method of heating and cooling a passenger compartment in a vehicle is now described with reference to the embodiment shown in FIGS. 1 and 3-4. The method is equally applicable to the embodiment shown in FIGS. 5-7 as well. In accordance with the method of heating and cooling a passenger compartment in a vehicle, a first flow of coolant is pumped through a heat source 18 and routed through at least one of first and second air-to-coolant heat exchangers 12, 14 connected in parallel and a second flow of coolant is pumped through a cold source 16 and routed through at least one of first and second air-to-coolant heat exchangers connected in parallel. A control module 20 is electrically connected to each of the air-to-coolant heat exchangers 12, 14 and controls the routing of the first and second coolant flows dependent upon a mode of operation of the vehicle.

Depending upon the mode of operation, a rate of flow of the first flow of coolant pumped through the heat source may range from a full flow to little, if any, flow and a rate of flow of the second flow of coolant pumped through the cold source may range from a full flow to little, if any, flow. In the cooling mode of operation, for instance, the first flow of coolant is pumped through the cold source 16 and routed through each of the first and second air-to-coolant heat exchangers 12, 14. In the described method, the rate of flow of the second flow of coolant pumped through the heat source 18 in this mode of operation is zero. Similarly, in the heating mode of operation, the second flow of coolant is pumped through the heat source 18 and routed through each of the first and second air-to-coolant heat exchangers 12, 14.

Again, the rate of flow of the first flow of coolant pumped through the cold source 16 is zero in this mode of operation.

In a dehumidification and reheating mode of operation, however, the rate of flow of the first flow of coolant and the rate of flow of the second flow of coolant are typically non-zero. In this mode of operation, the first flow of coolant is pumped and routed through the first air-to-coolant heat exchanger 12 and the second flow of coolant is pumped and routed through the second air-to-coolant heat exchanger 14.

By adjusting the rate of coolant flow in one or both of the air-to-coolant heat exchangers 12, 14, a temperature of air entering the passenger compartment may be controlled. In other words, the flow rate of the first flow of coolant through the heat source 18, the second flow of coolant through the cold source 16, or both the first and the second flows are controlled. Such control can be achieved utilizing control module 20 to adjust one or both of the pumps 32, 48.

The foregoing has been presented for purposes of illustration and description. It is not intended to be exhaustive or to limit the embodiments to the precise form disclosed. Obvious modifications and variations are possible in light of the above teachings. For example, the devices controlled by control module 20 in the described embodiment could be controlled by a plurality of control modules within the vehicle. The plurality of control modules could each control one or more devices within the system and communicate with one another via a controller area network (CAN) bus or a local interconnect network (LIN).

In still other embodiments, the heating and cooling system may include additional air-to-coolant heat exchangers connected in parallel with the first and the second air-to-coolant heat exchangers described above. In such a scenario, additional four-way valves or additional receiving and sending ports on manifolds and reservoirs may be required to route the first and second flows of coolant from the heat and cold sources dependent upon the mode of operation. In addition, the heating and cooling system may include a thermal management system for heating or cooling components via an auxiliary loop and/or the system may capture waste heat such as heat drawn away from the component in a heating mode of operation. All such modifications and variations are within the scope of the appended claims when interpreted in accordance with the breadth to which they are fairly, legally and equitably entitled.

What is claimed:

1. A vehicle heating and cooling system, comprising:
a cold source through which a first flow of coolant flows;
a heat source through which a second flow of coolant flows;
first and second air-to-coolant heat exchangers connected in parallel and to said cold and heat sources to allow the first flow of coolant to be directed through at least one of said first and second air-to-coolant heat exchangers and the second flow of coolant to be directed through at least one of said first and second air-to-coolant heat exchangers dependent upon a mode of operation; and
a controller configured to control the first and second flows of coolant dependent upon the mode of operation in such a manner so as to provide conditioned air to a passenger compartment of the vehicle without the use of a blend door.

2. The vehicle heating and cooling system of claim 1, wherein at least two four-way valves connect said cold source, said heat source, and said first and second air-to-coolant heat exchangers.

3. The vehicle heating and cooling system of claim 2, wherein said controller further controls said at least two four-way valves.

4. The vehicle heating and cooling system of claim 3, wherein said at least two four-way valves direct the first flow of coolant through said cold source and said first and second air-to-coolant heat exchangers for lowering a temperature within the passenger compartment in a cooling mode of operation.

5. The vehicle heating and cooling system of claim 3, wherein said at least two four-way valves direct the second flow of coolant through said heat source and said first and second air-to-coolant heat exchangers for raising a temperature within the passenger compartment in a heating mode of operation.

6. The vehicle heating and cooling system of claim 3, wherein said at least two four-way valves direct the first flow of coolant through said cold source and said first air-to-coolant heat exchanger and the second flow of coolant through said heat source and said second air-to-coolant heat exchanger for controlling a temperature within the passenger compartment in a dehumidification and reheat mode of operation.

7. The vehicle heating and cooling system of claim 6, wherein said controller adjusts a rate of at least one of the first and second flows of coolant.

8. The vehicle heating and cooling system of claim 3, further comprising a first pump for generating the first flow of coolant and a second pump for generating the second flow of coolant; wherein said controller controls at least one of said first and second pumps for controlling a temperature within the passenger compartment.

9. The vehicle heating and cooling system of claim 1, wherein at least two manifolds and two reservoirs connect said cold source, said heat source, and said first and second air-to-coolant heat exchangers.

10. The vehicle heating and cooling system of claim 9, wherein said controller further controls said at least two manifolds and two reservoirs.

11. The vehicle heating and cooling system of claim 10, wherein each of said at least two manifolds and two reservoirs include at least one sending port and at least one receiving port and said controller controls a degree of openness of said at least one sending port and said at least one receiving port of said at least two manifolds and two reservoirs.

12. The vehicle heating and cooling system of claim 9, wherein the first flow of coolant is pumped through said cold source for cooling the first flow of coolant, directed by said second manifold through said first and second air-to-coolant heat exchangers for lowering a temperature within the passenger compartment in a cooling mode of operation, and returned to said second reservoir.

13. The vehicle heating and cooling system of claim 9, wherein the second flow of coolant is pumped through said heat source for warming the second flow of coolant, directed by said first manifold through said first and second air-to-coolant heat exchangers for raising a temperature within the passenger compartment in a heating mode of operation, and returned to said first reservoir.

14. The vehicle heating and cooling system of claim 9, wherein the first flow of coolant is pumped through said cold source for cooling the first flow of coolant, directed by said second manifold through said first air-to-coolant heat exchanger, and returned to said second reservoir, and the second flow of coolant is pumped through said heat source for warming the second flow of coolant, directed by said first manifold through said second air-to-coolant heat exchanger, and returned to said first reservoir, for controlling a temperature within the passenger compartment in a dehumidification and reheat mode of operation.

15. The vehicle heating and cooling system of claim 1, wherein one of said first flow of coolant and said second flow of coolant is directed through an auxiliary coolant loop for changing a temperature of a component.

16. A vehicle heating and cooling system, comprising:
a coolant loop connected to allow a first flow of coolant, cooled within a chiller, to be directed through at least one of first and second air-to-coolant heat exchangers connected in parallel, and to allow a second flow of coolant, heated within a condenser, to be directed through said at least one of first and second air-to-coolant heat exchangers connected in parallel dependent upon a mode of operation; and
a controller configured to control said first and second flows of coolant dependent upon the mode of operation such that conditioned air is provided to a passenger compartment of the vehicle without the use of a blend door.

17. A method of heating and cooling a passenger compartment in a vehicle, comprising the steps of:
pumping a first flow of coolant through a cold source;
pumping a second flow of coolant through a heat source;
routing the first coolant flow through at least one of first and second air-to-coolant heat exchangers connected in parallel;
routing the second coolant flow through at least one other of said first and second air-to-coolant heat exchangers connected in parallel; and
controlling said pumping and routing steps dependent upon a mode of operation to provide conditioned air to the passenger compartment of the vehicle without the use of a blend door.

18. The method of heating and cooling a passenger compartment in a vehicle of claim 17, wherein the first flow of coolant is pumped and routed through said first air-to-coolant heat exchanger and the second flow of coolant is pumped and routed through said second air-to-coolant heat exchanger in a dehumidification and reheating mode of operation.

* * * * *